Sept. 14, 1965  J. W. BLACK, JR  3,205,731
ROTARY SPEED DIFFERENTIAL MECHANISM
Filed Oct. 26, 1962  2 Sheets-Sheet 1
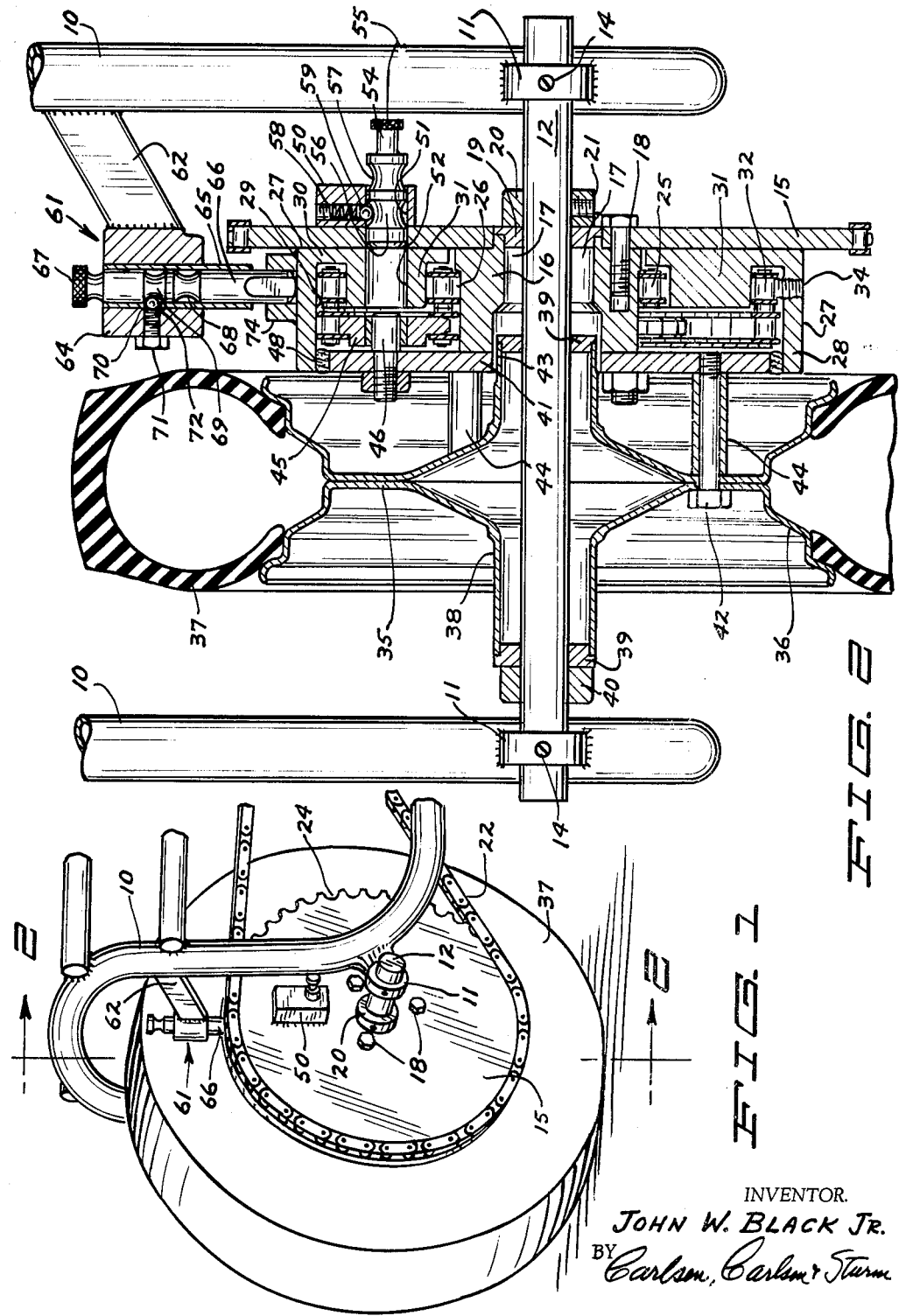
INVENTOR.
JOHN W. BLACK JR.
BY Carlsen, Carlsen & Sturm
ATTORNEYS

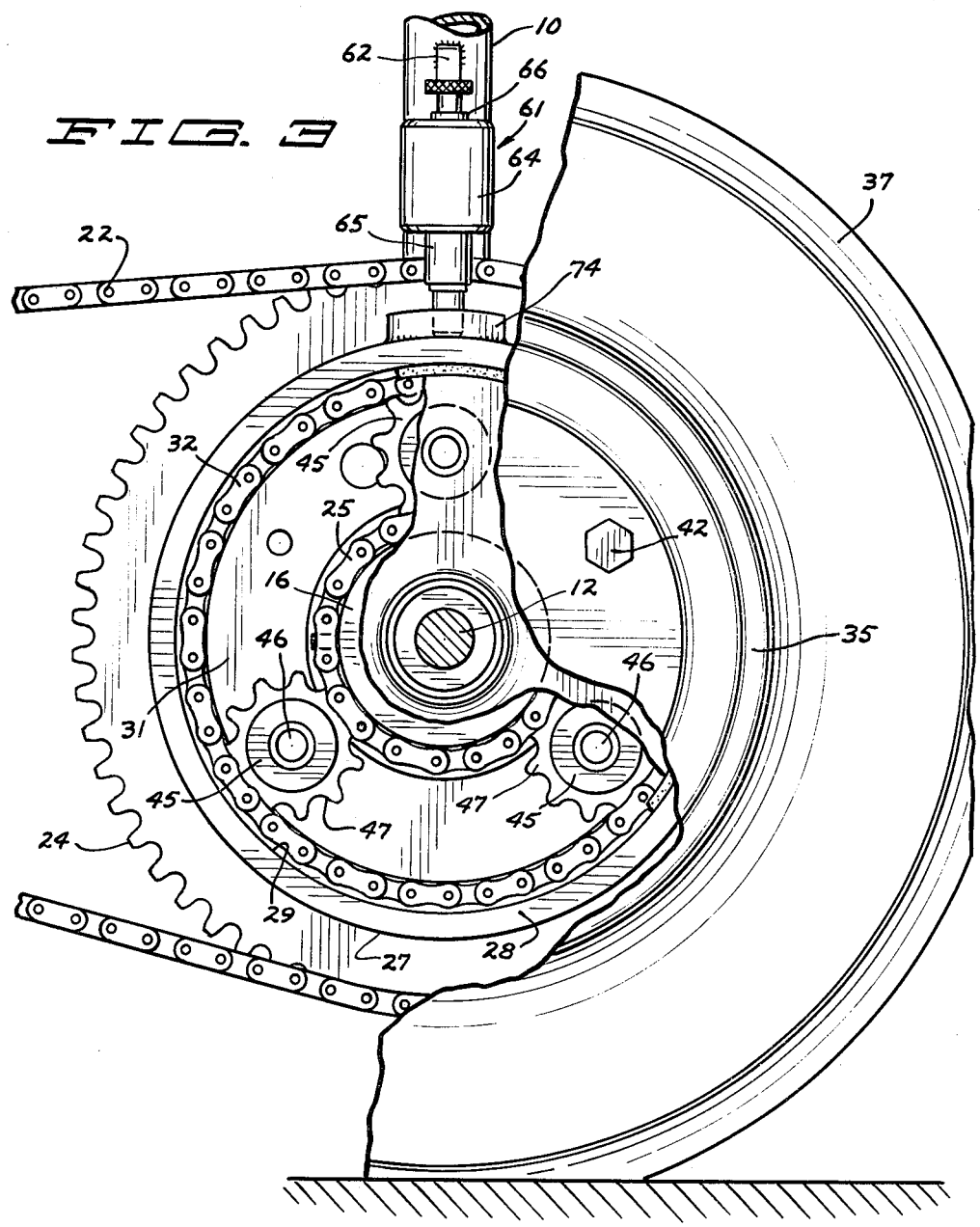

United States Patent Office 3,205,731
Patented Sept. 14, 1965

3,205,731
ROTARY SPEED DIFFERENTIAL MECHANISM
John W. Black, Jr., 5651 Skyway, Paradise, Calif.
Filed Oct. 26, 1962, Ser. No. 233,318
3 Claims. (Cl. 74—785)

This invention relates generally to the art of changing the speed between a driving element and a driven element and more particularly pertains to differential mechanism of the epicyclic or planetary type wherein the speed change is effected between two or more members rotating on a common axis.

Apparatus of the type here concerned is commonly referred to as differential gear mechanism for the purpose of varying the power or velocity between the driving and driven member. Through the utilization of such a device the power or speed of the driven member may be varied in accordance with a desired given ratio with a sacrifice in speed increasing the power and vice versa. Such mechanisms are generally comprised of intermeshing gears of such size and relative arrangement to produce the desired results.

It is found, however, that conventional gearing with intermeshing teeth is not satisfactory in many applications particularly where the mechanism may be exposed to particles of dirt, moisture or the like. In such cases the gears, even though hardened, are subject to frequent clogging and relatively rapid deterioration through wear, thus causing frequent breakdown of the mechanism.

An object of the present invention is to provide coaxial speed differential mechanism in which the intermeshing components are so constructed and arranged to perform their intended function for an extended period of time as compared to known devices due to the durable nature of the components and their inherent ability to withstand any deteriorating effect by the outside elements.

Another object of the invention is to provide such a mechanism which is relatively light in weight, inexpensive to manufacture, and simple to repair if a breakdown should occur.

Still another object of the invention is to provide such a mechanism with a rolling engagement between contacting parts to limit wear and reduce the necessary amount of lubrication.

Another object of the invention is to provide a speed differential mechanism in which the construction readily lends itself to sealing off of the intermeshing components.

Another object of the invention is to provide a speed differential mechanism between coaxial driving and driven components thereof which provides for circumferential distribution of power between said components at any ratio.

Still another object of the invention is to provide such a mechanism which is selectively convertible for use to increase or decrease speed between components, or to keep the speed constant therebetween, and which mechanisms may be used in series to produce virtually any desired speed change result.

With these and other objects in view the invention broadly comprises a planetary type speed differential mechanism for mounting on a fixed frame in which the normally driving sun member and the surrounding ring member respectively fixedly carry continuous sections of roller chain disposed in radially spaced concentric relation, a normally driven member disposed coaxially with the sun member and carry a plurality of circumferentially spaced planetary sprockets each of which is in intermeshing engagement with both sections of roller chain. The invention is further characterized by a releasable locking means for selectively locking the normally driving member and ring member against relative rotation to produce a direct drive or one-to-one ratio between the driving and driven members and a second releasable locking means for selectively locking the ring member to the frame to thus produce a reduced speed drive between the driving and driven members.

The above mentioned and other objects will be brought to light during the course of the following specification, reference being made to the accompanying drawings, in which FIG. 1 is a perspective view showing the mechanism applied to the driving ground wheel of a vehicle.

FIG. 2 is an enlarged vertical section taken in an axial direction through the wheel and mechanism shown in FIG. 1, the section being taken along the line 2—2 therein.

FIG. 3 is a side elevation of the mechanism looking from the left side in FIG. 2 and with the wheel partially broken away to show certain components of the mechanism in detail.

Referring now more particularly to the drawings, reference characters will be used to denote like parts or structural features in the different views. The invention is here shown as it might be applied to a driving ground wheel of a vehicle to vary the speed and power thereof from the vehicle power source. The number 10 indicates generally a portion of the vehicle frame. A pair of shaft support collars 11 are integrally mounted on the frame 10 in transverse alignment relative to the direction of vehicle travel. The collars 11 jointly support a shaft or axle 12 which is secured against rotation or endwise movement in the collars by set screws 14.

While the mounting shaft 12 extends laterally, for purposes of conveninece and clarity in description, the terms "inner" and "outer" will be used respectively to denote the left hand and right hand portions of the shaft as viewed in FIG. 2 and describing the relative arrangement of the shaft mounted parts.

Near its outer end the shaft supports a large sprocket 15 which has an inwardly projecting central hub 16 which is journaled for rotation on the shaft 12 as by needle bearings 17. The sprocket 15 is secured to the hub by means of one or more bolts 18. A lubricant sealing ring 19 is disposed between the hub 16 and a stop ring 20 held against sliding movement on the shaft 12 by set screw 21. Roller chain 22, a section of which is shown in FIG. 1, is trained around the toothed periphery 24 of sprocket 15 and a similar sprocket (not shown) having a direct driven connection with the vehicle power source. It will thus be understood that in the embodiment disclosed the sprocket 15 is rotated on shaft 12 by means of the chain 22 and the sprocket and its associated hub 16 are considered the driving member of the speed differential mechanism.

A length of double strand roller chain 25 extends tightly around the hub 16 in continuous manner with set screws 26 extending through the outer strand to hold the chain in fixed position on the hub. The axes of the rollers in chain 25 are parallel to shaft 12. Hub 16 with its mounted chain 25 may be referred to as the "sun" of the planetary mechanism.

An annular intermediate or "ring" member designated at 27 encircles the hub 16. This intermediate member has a peripheral ring portion 28 presenting an annular surface 29 which is concentric with and faces inwardly toward the hub 16. An outer supporting wall 30 of member 27 is disposed next to the sprocket 15 and this wall has an annular boss 31 projecting inwardly to encircle the outer strand of the roller chain 25. A second length of double strand roller chain, denoted at 32, having a length approximately three times that of chain 25 extends around the surface 29 in continuous manner being affixed to the ring portion 28 by means of set screws 34. It will be noted (FIG. 2) that this chain is so positioned as to have its inner strand lying radially spaced from and on a common plane with the inner strand of chain 25, said plane being perpendicular to the axis of shaft 12.

A ground wheel 35, having a rim 36 carrying the tire 37, has a central hub 38 which is journaled on the shaft 12 by end bearings 39. The wheel is held against inward movement axially along the shaft by means of the collar 40 which is secured to the shaft in the same manner as the member 20.

A disc 41 is secured as by a plurality of circumferentially spaced bolts 42 to the outer side of the wheel, the bolts extending through spacer tubes 44. This disc which is centrally apertured as at 43 to encircle the hub serves as a planetary carrier for the mechanism forming the subject matter of the invention. A series of three planetary sprocket members 45 (FIG. 3) are journaled on plate mounted pins 46 which are circumferentially spaced at one hundred twenty degrees about the shaft 12. Each of these sprockets 45 has peripheral teeth 47 which are disposed in intermeshing relationship with both the roller chains 25 and 32. A gasket 48 provides a peripheral seal between the peripheral edge of disc 41 and the inner portion of the ring 28.

A latch housing 50 is mounted on the outer side of the sprocket 15. The sprocket and housing are provided with an axially directed passage 51 adapted to align with an aperture or passage 52 in the intermediate member portion 31. A plunger type latch bolt 54 is disposed for longitudinal sliding movement in the passage 51. The bolt has an operating handle 55 and inner and outer longitudinally spaced grooves or seats denoted respectively at 56 and 57. The housing 50 is also provided with a passage 58 disposed perpendicular to passage 51 for holding a spring tensioned ball detent 59 adapted to seat in the grooves 56 or 57 to yieldably retain the bolt 54 against longitudinal sliding movement.

It will be understood that when bolt 54 is in its inner position, with detent 59 seated in groove 57, it will be effective in locking the intermediate member 27 to the sprocket member 15. In this condition the members 15 and 27 and their respectively carried roller chain strands will obviously rotate about shaft 12 at the same rate. The chains will irrotatably carry the planetary sprockets 45 between them, thus also rotating disc 41 and the wheel 35 at the same rate. It will accordingly be understood that when the latch bolt 54 is in its inner or locking position, a one-to-one drive ratio will be provided between the driving sprocket 15 and the wheel 35.

To unlock the intermediate member 27, bolt 54 is pulled outwardly to the position shown in FIG. 2 causing the detent 59 to retract and reseat in the groove 56 with the bolt completely removed from passage 52 and out of engagement with the member 27. When the mechanism is in this condition it may be said to be in neutral and the rotation of the hub 16 will be transmitted to the member 27 through sprockets 45 which will idle due to the load on the ground wheel causing the member 27 to rotate in a reverse direction.

Another locking or latch device, designated generally at 61, is integrally mounted on the frame 10 by means of a suppport arm 62. This device is for the purpose of selectively locking the intermediate member 27 relative to the frame. A tubular sleeve 64 is mounted on the arm 62 and has a bushing 65 fixed within the passage thereof with the axis of the bushing disposed radially with respect to the shaft 12. An elongated latch member 66 having an operating handle 67 at its outer end is slidably disposed within the bushing 65. This latch is similar to the latch 54 having longitudinally spaced grooves 68 and 69 adapted to seat the ball detent 70 which is tensioned by a spring disposed between the ball and screw 71 and extending through passage 72 in the side wall of the latch holder and bushing. An annular boss or catch 74 on the periphery of the member 28 forms a seat for reception of the end of the latch 66, as shown in the drawings, to lock the member 28 against rotation. The latch is held in this condition by the detent 70 being seated in groove 69.

To release the member 27 the latch is pulled outwardly until the detent ball seats in groove 68 and in this position the latch is fully withdrawn from the socket formed by boss 74.

The operation of the mechanism with latch 54 in withdrawn position and latch 66 in its lower position in locking engagement with the element 74 will now be explained and will be most clearly understood by reference to FIG. 3. It will be understood that the chain 32 will be locked in fixed or irrotatable position with the intermediate or ring member 27. Accordingly, as roller chain 25 is rotated with the hub 16, the sprocket members 45 will be caused to roll along chain 32 rotating the wheel therewith. Inasmuch as chain 32 is three times the length of chain 25, hub 16 will move through three revolutions to one revolution of the planetary sprockets and the wheel 35 about the axis of the shaft 12. There is thus a three-to-one reduction between the drive sprocket 15 and the ground wheel 35 when the mechanism is in this condition.

The advantages in this construction over conventional gear reduction mechanism utilizing intermeshing gear teeth are many and significant. Of prime importance is the fact that interengagement between the drive, intermediate, and driven members is effected completely through the meshing of sprockets and roller chain. In such an arrangement the chain rollers are constantly rotating to continuously change the wearing surface thereof for longer life of the mechanism. Moreover, in such construction the intermeshing elements tend to clear themselves of dirt and debris. It is also significant that, with the normally ready availability of parts, repair of the construction is relatively quick, simple and inexpensive to accomplish.

The mechanism described can be reversed to increase the speed ratio or a plurality of such mechanisms can be used in series or stacked relation to increase or decrease the speed ratio between the drive and driven member as desired.

It is also found that perfect alignment between the members is maintained at all times between the sprockets and roller chain and that the transmitted power through the sprocket pinions is equalized in the construction shown.

The speed differential mechanism shown accordingly economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a rotary speed reduction mechanism, a frame, a shaft mounted on the frame, a first member journaled for rotation on the shaft, a second member journaled for rotation on the shaft and having an annular hub extending axially along the shaft toward the first member, said hub having an annular surface facing radially outward from the shaft, an intermediate member disposed axially between the first and second members in encircling relation to the hub and having an annular surface facing the hub and concentric with said external hub surface and radially spaced therefrom, first and second roller chains encircling the hub and respectively fixed to said hub surface and said intermediate member surface, a plurality of sprockets journaled on the first member for rotation on circumferentially spaced axes and each of said sprockets intermeshing with both roller chains, and each of said roller chains comprising a double series of interlinked rollers in side by side relation with one series in each chain being connected to the surface to which the chain is fixed and the other series in each chain being intermeshed with said sprockets.

2. The subject matter of claim 1 in which said intermediate member is provided with an annular boss which is disposed between and circumferentially separates the said one series of the roller chains in close proximity thereto to partially support the chains in a concentric pattern.

3. In a rotary speed differential mechanism for a vehicle ground wheel journaled on a shaft, said shaft being fixedly mounted on the frame of the vehicle, a planetary carrier integrally mounted on the wheel, a circular drive member journaled on the shaft, said drive member having a toothed periphery for engagement by a drive chain leading from a power source, said drive member having a central annular hub journaled on the shaft and extending therealong toward the carrier, an annular ring member concentrically encircling the hub intermediate the drive member and carrier, said hub and ring member respectively fixedly carrying concentric radially spaced continuous strands of roller chain, a trio of planetary gears of equal diameter rotatably mounted on the planetary carrier in circumferentially equally spaced positions about the shaft and for rotation on axes parallel to the shaft, said gears having peripheral teeth in meshing engagement with both of said strands of roller chain, a catch on the outer periphery of the ring member, a locking device mounted on the vehicle frame and carrying a movable latch for selective movement between an advanced position in engagement with said catch to lock the ring member to the frame and a retracted position allowing rotational movement of the ring member about the shaft axis, a second locking device mounted on the drive member and having latch means for selectively locking the drive member and ring member against relative rotation, and each of said strands of roller chain comprising a side by side double series of links with one series fixedly connected to the carrying member and the other series in meshing engagement with said planetary gears.

References Cited by the Examiner

UNITED STATES PATENTS

| 499,694 | 6/93 | Wright | 74—801 |
| 1,159,486 | 11/15 | Froelich | 74—465 |
| 1,799,393 | 4/31 | Rylander | 74—785 |
| 2,281,353 | 4/42 | Hubbard | 74—785 |
| 2,517,875 | 8/50 | Henry | 74—785 |
| 3,055,236 | 9/62 | Born | 74—785 |
| 3,079,807 | 3/63 | Hornsteiner | 74—415 |

FOREIGN PATENTS

| 928,979 | 6/47 | France. |
| 989,873 | 5/51 | France. |
| 19,608 | 1904 | Great Britain. |

DON A. WAITE, *Primary Examiner.*